United States Patent [19]

Baker, Jr. et al.

[11] 4,376,250

[45] Mar. 8, 1983

[54] PORTABLE POWER SOURCE

[75] Inventors: James W. Baker, Jr., Seattle; Paul W. Hodge, Bothell; Franklin R. Schneider, Seattle, all of Wash.

[73] Assignee: Dynamote Corporation, Seattle, Wash.

[21] Appl. No.: 106,675

[22] Filed: Dec. 26, 1979

[51] Int. Cl.³ .......................................... H02M 7/515
[52] U.S. Cl. .................................. 307/150; 307/151; 363/135
[58] Field of Search ................. 307/10 R, 9, 150, 151; 363/252 M, 135, 136, 124, 27, 28

[56] References Cited

U.S. PATENT DOCUMENTS

| 2,968,738 | 1/1961 | Pintell | 307/150 |
| 3,068,415 | 12/1962 | Johnson | 307/150 X |
| 3,366,867 | 1/1968 | Dodge | 307/151 X |
| 3,967,133 | 6/1976 | Bokern | 307/10 R |

*Primary Examiner*—G. Z. Rubinson
*Assistant Examiner*—James L. Dwyer
*Attorney, Agent, or Firm*—Graybeal & Uhlir

[57] ABSTRACT

An apparatus providing a source of alternating power for power devices is disclosed. The apparatus comprises a frame member having a plurality of ground engaging wheels for transporting the frame member along the ground. The frame member carries a plurality of DC storage means therein. A transformer means carried on the frame has a low voltage center tapped winding, a line voltage winding, and a high voltage winding. The low voltage center tapped winding is in communication with the DC storage means, and the line voltage winding is operable to produce an AC output voltage suitable for powering devices. A plurality of controllable rectifier means is in communication with both the high voltage winding and the low voltage center tapped winding. The rectifier means are operable to alternately provide a conduction path for said DC storage means through both halves of the low voltage center tapped winding.

22 Claims, 6 Drawing Figures

PORTABLE POWER SOURCE

TECHNICAL FIELD

The present invention relates in general to power supplies, and more particularly to a portable rechargeable electrical power supply.

DESCRIPTION OF THE PRIOR ART

In the prior art, various devices have been used to provide a source of electrical power for jobsite power tools, appliances, or the like. One such device is of the gasoline motor generator type whereby the rotating mechanical output of an internal combustion engine is converted electromechanically to AC output power. Such a device typically has several disadvantages. The internal combustion engine had to be run continuously between uses of the jobsite power tools resulting in the waste of fuel. Additionally, the use of a volatile fuel can result in the escape of potentially hazardous fumes thereby essentially limiting the use of the device to an outdoor environment. The use of an electromechanical device concerting the rotating mechanical output of the engine into usable AC output power required frequent maintenance to ensure the device functioned properly. Finally, the use of an internal combustion engine with an electromechanical means inherently produced an AC output power with nonstable frequency.

Another such device providing a source of electrical power for jobsite tools is of the battery powered electromechanical type. Devices such as these utilize an electric motor coupled to electric AC generators. In that these devices utilize batteries or the like as the main source of DC power, no hazardous fumes were produced and the devices could be used in an indoor environment. However, due to the fact that the device required energy to rotate mechanical components, the AC output power had inherent frequency stability problems. In addition, such devices generally had a low efficiency and a limited use capability in that no charging of the DC power sources typically were provided.

A third type of device disclosed in the prior art providing a source of electrical power is of the vehicle inverter type. These devices are affixed to a vehicle such as a four wheel drive vehicle or the like, and are adapted to be powered from the vehicle's storage battery. Since the device is fixed to a vehicle, it is inherently nonportable. Furthermore, any recharging capability for such devices was through the vehicle's internal combustion engine which required operation to periodically charge the vehicle's battery.

The present invention overcomes these problems and limitations of the prior art. By utilizing a plurality of deep discharge type batteries in series communication with each other and carried by a frame movable over the ground, the present invention is easily portable and is especially adapted for use in an indoor environment. By utilizing solid state electronics, the present invention provides an efficient source of AC output power having close frequency stability. By uniquely combining the DC to AC inversion electronics with recharging electronics, the present invention provides a means by which the batteries may be charged easily and conveniently from any available, conventional utility power line. Finally, a unique load demand circuit allows the present invention to automatically return to an idle or lower power condition when the jobsite tool is not in use thereby prolonging the operational life of the batteries before recharging is required.

SUMMARY OF THE INVENTION

According to one aspect of the present invention, an apparatus providing a source of alternating power for power tools comprises a frame member. The frame member has a plurality of ground engaging wheels for transporting the frame member along the ground. The frame member carries a plurality of DC storage means and a transformer means. The transformer means has a low voltage center tapped winding, a line voltage winding, and a high voltage winding. The low voltage center tapped winding is in communication with the plurality of DC storage means, and the line voltage winding is operable to produce an AC voltage suitable for powering tools. Finally, a plurality of controllable rectifier means is in communication with both the high voltage winding and the low voltage center tapped winding and is operable to alternately provide a conduction path for the DC storage means through both halves of the low voltage center tapped winding.

It is an object of the present invention to provide an apparatus providing a source of alternating power for power tools that is both portable and usable in a closed environment.

A further object of the present invention is to provide portable power source than can be recharged from any convenient line source.

A still further object of the present invention is to provide a portable power source that does not require frequent recharging.

A still further object of the present invention is to provide a power source producing AC output power having a stable frequency.

A still further object of the present invention is to provide a power source producing usable AC output power only during the time when a jobsite power tool is operated.

A still further object of the present invention is to provide a power source having quiet operation.

These and other objects, features and advantages of the present invention will become more apparent in light of the detailed description of the preferred embodiment set forth hereafter, and illustrated in the accompanying drawings.

BEST MODE OF CARRYING OUT THE INVENTION

Figure 1:
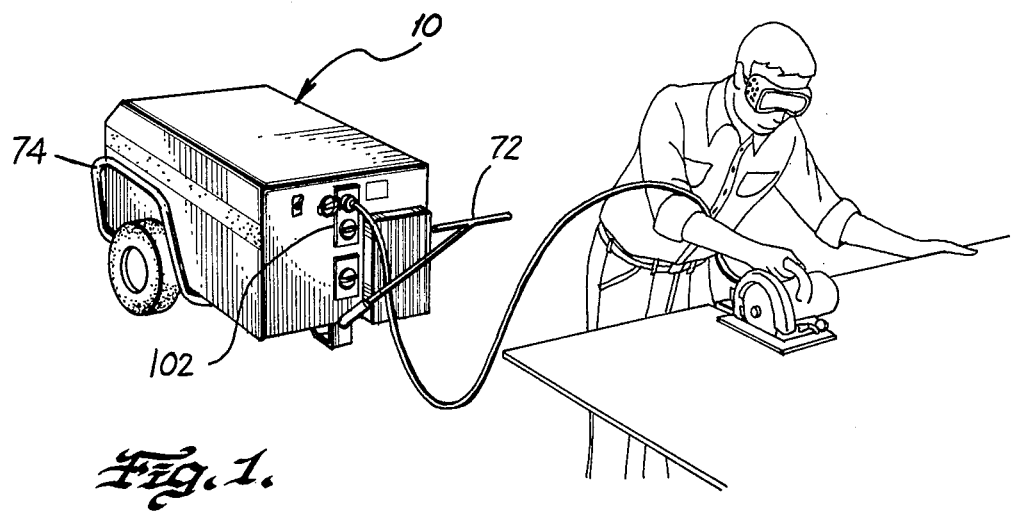
FIG. 1 is an illustration of one embodiment of the present invention showing its use in conjunction with a typical jobsite power tool.

With reference to FIG. 1, the present invention, shown generally at 10, is a portable apparatus providing a source of alternating power for typical jobsite power tools such as circular saws, drills, sanders and the like. The present invention is particularly adapted for use in an environment in which a source of alternating power as yet does not exist such as typically found at new home construction sites. By connecting the jobsite power tool to a duplex outlet provided by the present invention, the power tool operator has a source of alternating power with which to operate the power tool. Due to its portability, the present invention is particularly well adapted to be used whenever the jobsite power tool is used.

Figure 2:
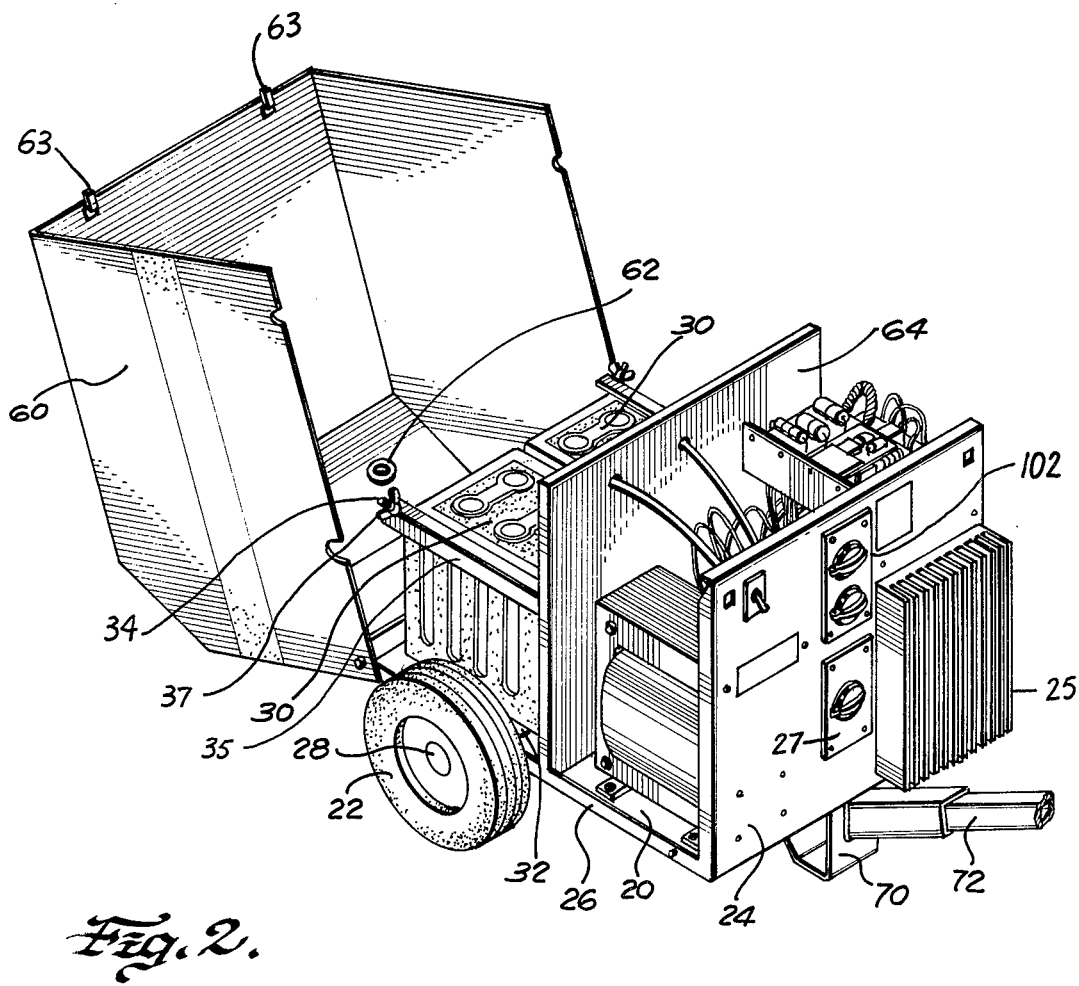
FIG. 2 is a perspective view of one embodiment of the present invention with the cover member shown in the raised position.
Figure 3:
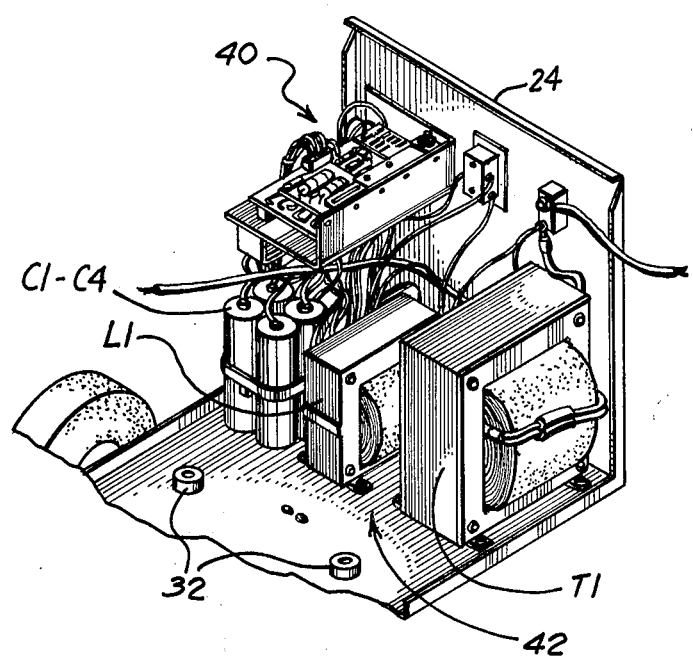
FIG. 3 is another perspective view of a typical embodiment of the present invention showing the location of the electrical components thereof.

With reference to FIG. 2, the present invention 10 generally comprises a frame member 20 having a plurality of ground engaging wheels 22 for transporting the frame member over the ground. The frame member carries a plurality of DC storage means 30 disposed substantially rearwardly on the frame member. The frame member has a front face 24 disposed at the forward end of the frame member for mounting a duplex outlet 102, an input receptacle 27 and an external heat sink as will be described more fully below. The duplex outlet 102 and input receptacle 27 are of a weatherproof type and provide the power interface for the power tool and the interface for a convenient utility line with which to charge the DC storage means. With reference to FIG. 3, the front face 24 also carries an electronic circuit module 40 in close proximity to other electrical components (shown generally at 42) comprising the present invention. A cover 60 is hingedly secured to the frame member generally at its rearward end and provides a drip proof housing for the electronic circuit module and/or the DC storage means. A ground engaging foot member 70 is disposed substantially forwardly under the frame member and provides a means with which to maintain the frame member substantially parallel to the ground. A forward handle 72 is detachably secured to the foot member enabling the foot member to be lifted from ground engagement and the frame member to be moved over the ground. A plurality of side handles 74 disposed on each side of the frame member provides a means by which the present invention may be picked up for subsequent transportation.

With reference to FIG. 2, a lip 26 extends upwardly from the frame member circumferentially therebetween around and provides, in part, additional structural support to the frame member. A plurality of ground engaging wheels 22 are carried on either side of the frame member by an axle shaft 28 extending across the width of the frame member and extending through opposite lips. The plurality of ground engaging wheels are rotatably connected to the axle shaft by means which are old per se. In the preferred embodiment, the frame member and the front face are integrally formed from cold rolled steel.

In one embodiment of the present invention, the frame member carries DC storage means the form of plural DC storage batteries 30 in series communication with each other. In the preferred embodiment, each DC storage battery comprises a deep discharge marine type or automotive type battery. Deep discharge batteries differ from conventional batteries in that they utilize fewer and larger plates than conventional batteries. In addition, deep discharge batteries have more series resistance and are more suited to provide a source of DC power for use in applications where recharging occurs infrequently than conventional batteries. In the preferred embodiment, each battery provides a twelve volt DC output, and when in series communication with a corresponding battery, the combination provides a twenty four volt DC power source for the electrical components of the present invention. Each battery is mounted to the frame member and spaced apart therefrom by a plurality of shock mounts 32 disposed substantially at each corner of each storage battery. The shock mounts are old per se. The batteries are secured from movement on the frame member by a plurality of battery bracket rods 34 in conjunction with a plurality of battery brackets 35. One end of each battery bracket rod extends through the frame member and is secured thereto by a bolt or the like. The battery brackets are secured to the other end of each battery bracket rod by means which are old per se, such as by use of a wing nut 37 in conjunction with flat and lock washers.

With reference to FIG. 2, a cover 60 is hingedly secured to the rearward portion of the frame member by means which are old per se. The cover provides a substantially drip proof housing for the plurality of DC storage means and the electrical components of the present invention. In an alternate embodiment of the present invention, the cover is attached to the frame member so as to extend only over the electrical components of the present invention. In this embodiment, the plurality of DC storage means are exposed to the external environment. In the preferred embodiment, the cover has a plurality of vent caps 62 providing a means by which any gas discharged from the DC storage means may be vented to the external environment. When in the closed position, the cover is secured to the frame member and the front face by a plurality of positive fasteners 63. Each positive fastener is old per se and is typically made from rubber or the like. The cover, the frame member, and the circuit boards within the electronic circuit module are all coated with an acid proof covering to minimize susceptability to damage as a result of inadvertent drainage or spillage from the DC storage means. To minimize the potential damage to the electronic circuit, a splash guard 64 comprising a flexible nonconductive material is disposed between the DC storage means and the electronic circuit module and extends upwardly from the frame member. With reference to FIG. 2, the location of the DC storage means and the ground engaging wheels with respect to the frame member as well as the external geometry of the cover is such that the present invention cannot stand on its end due to the fact that its center of gravity is slightly forward of the natural pivot point of the frame member. This feature prevents the DC storage means from being inadvertently drained.

The electronic components of the present invention (see FIGS. 3, 5, 6) are contained substantially within an electronic circuit module 40 detachably secured to the front face 24 of the frame member 20. The remaining electrical components (shown generally at 42) are disposed on the forward end of the frame member in close proximity to the electronic circuit module. These components generally form an inverter and a battery charger that is a means transforming DC power into usable AC output power, and AC power into DC power with which to recharge the plurality of DC storage means. The inverter comprises a transformer T1 having a low voltage center tapped winding 110, a line voltage winding 100, and a high voltage winding 112. An inductor L1 is disposed adjacent to and spaced apart from the transformer T1. A plurality of commutation capacitors C1, C2, C3, C4 are disposed adjacent to the inductor and are in communication with a plurality of silicon controlled rectifiers SCR1, SCR2, SCR3 and SCR4 (FIG. 5) to interrupt or reverse the direction of flow of the current therethrough as will be more fully discussed below.

Figure 4:
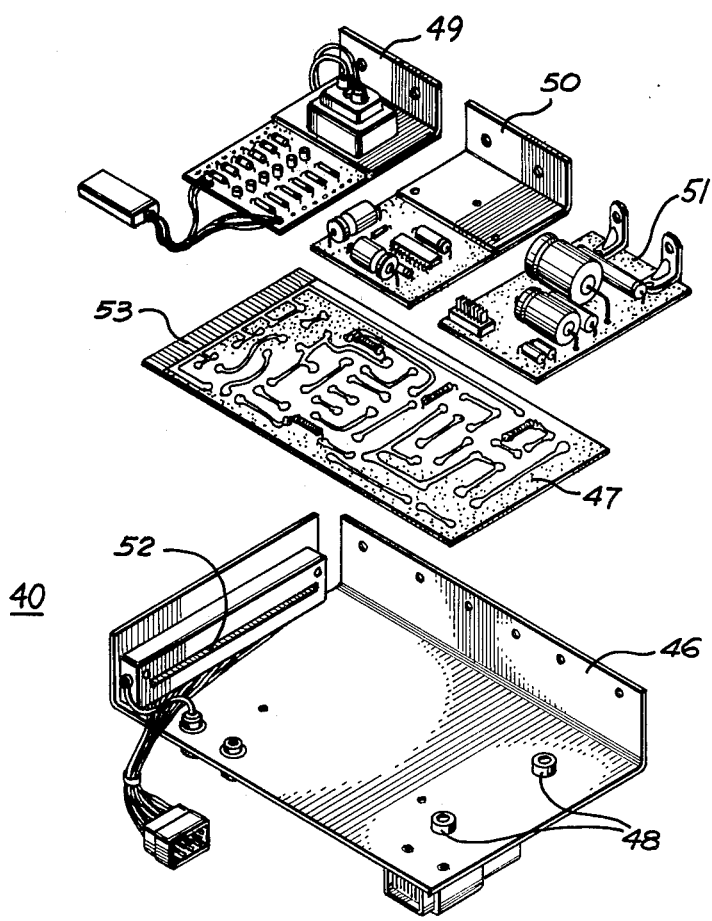
FIG. 4 is an exploded perspective view of a typical electronic circuit module according to the present invention.
Figure 5:
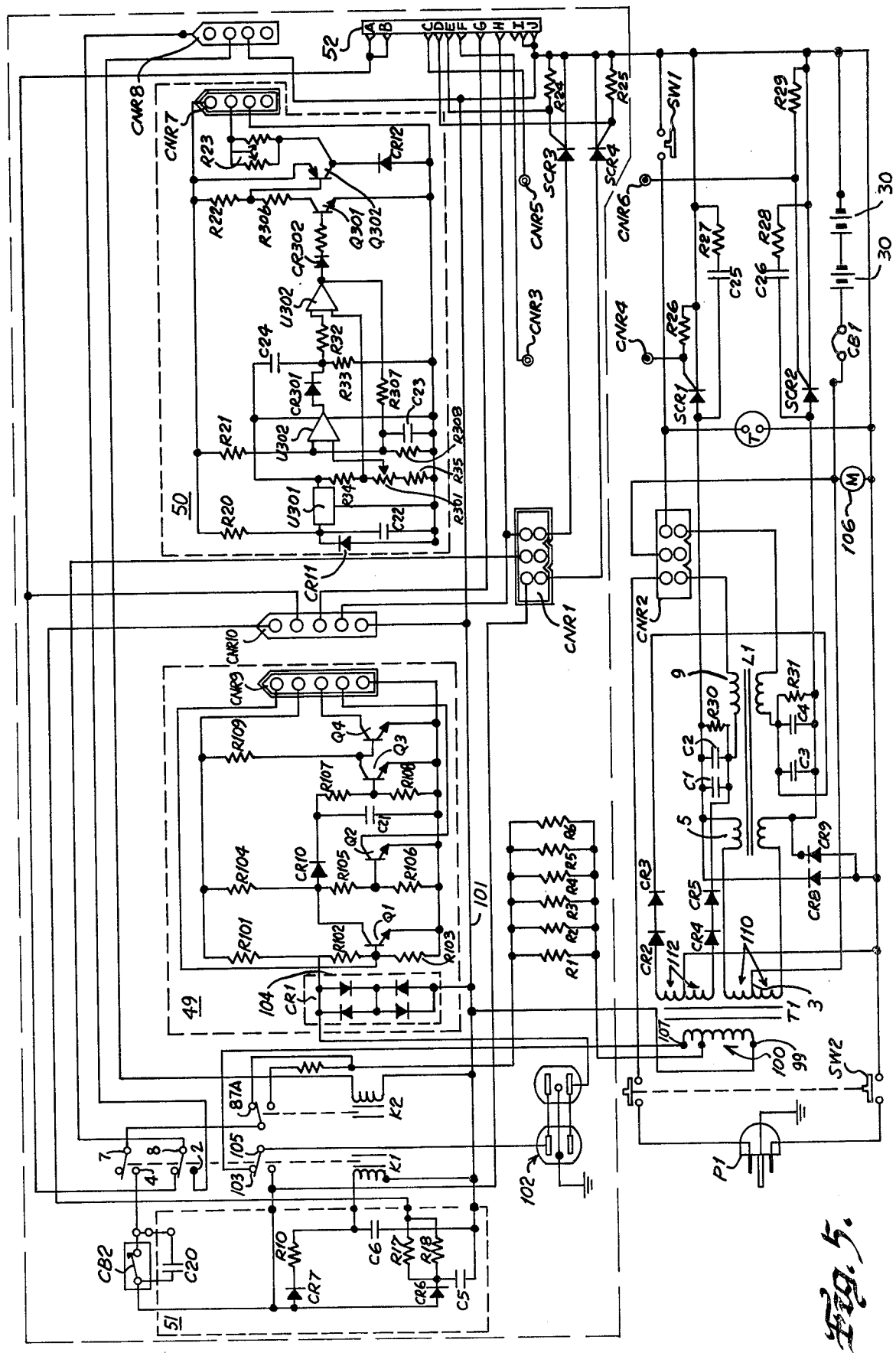
FIG. 5 is an electronic schematic diagram showing portions of a typical embodiment of the present invention.
Figure 6:
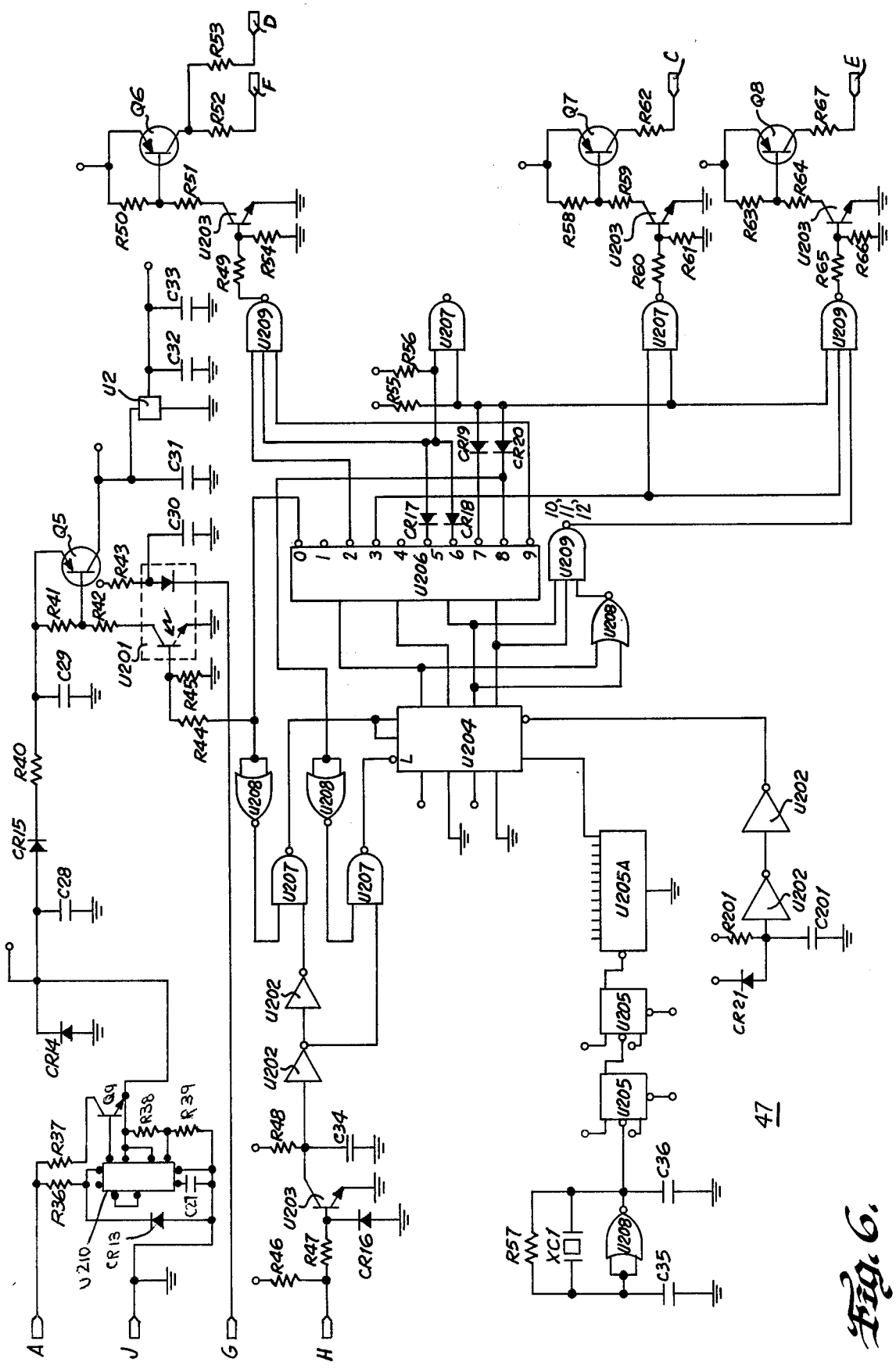
FIG. 6 is an electronic schematic diagram showing still further portions of a typical embodiment of the present invention.

With reference to FIG. 4, the electronic circuit module 40 generally comprises a metal bracket 46 detachably secured to the front face 24 of the frame member 20. An oscillator circuit board 47 is detachably secured to the metal bracket through a connector 52 disposed on the bracket and a corresponding connector 53 on the circuit board. The oscillator circuit board is spaced apart from the bracket by a plurality of standoffs 48. A load demand circuit board 49, a charger circuit board 50, and a supplementary circuit board 51 are each disposed above and spaced apart from the oscillator circuit board. Each of these circuit boards are parallel to each other and are removably secured to the metal bracket by means which are old per se. As will be described more fully below, the oscillator circuit board 47 contains a crystal oscillator XC1 and provides the sequence and timing with which to control the operation of the inverter of the present invention. The load demand circuit board 49 controls the operability of the oscillator circuit board 47 in response to the load demand at the duplex output receptacle 102 on the front face 24. The charger switching board 50 switches the charger circuit of the present invention between a rapid or boost charge and a final charge in response to the DC battery charge level. Finally, the supplementary circuit board 51 contains the electrical components which supervise the transfer from the inverter to charger function in response to the presence of utility power at the input receptacle. Since the present invention utilizes the free flow of air to cool the electronics, two of the silicon controlled SCR1 and SCR2 (not shown) rectifiers are mounted to a heat sink 25 carried on the front face 24. With reference to FIGS. 5, 6, and Table 1 the operation of the present invention will next be described.

INVERTER CIRCUIT

The inverter used in the present invention converts DC power into usable AC power with which to power the jobsite tool or the like. With reference to FIG. 5, one end 99 of winding 100 a line voltage of transformer T1 is connected to a common bus 101 with the other end 107 of the winding being connected to relay K1. Pin 105 of relay K1 is connected to the hot side of one of the plurality of duplex outlets 102 mounted on the front face 24. The neutral side of the duplex is connected through a diode bridge rectifier CR1 located on the load demand circuit board 49 to the common bus 101. The output of the plurality of DC storage means 30, typically 24 VDC, is routed through circuit breaker CB1 to the positive junction on charge meter 106 and subsequently through connector CNR1-CNR2, through pins 8 and 2 of relay K1 to the load demand circuit board 49 through connectors CNR9-CNR10 and to the oscillator circuit board 47 through pins A and B of comnector 52 to power the oscillator circuit 47.

Winding 100 provides a load path to the duplex receptacle 102 and is connected through the diode bridge rectifier CR1 on the load demand board 49 so that the diode bridge has substantially a 1.4 volt drop in either direction whenever the load, such as a power tool, is being powered. In this instance, four diodes contained in bridge rectifier are essentially short circuited so that current flows through two forward biased junctions in either direction.

The top leg 104 of the diode bridge rectifier CR1 is supplied with current from the DC storage means 30 through resistor R101. This raises the DC voltage on the top leg 104 of the diode bridge rectifier to 1.4 volts when no load is present. When a load is present at the duplex receptacle 102, the diode bridge is effectively bypassed to the common bus 101 through the load, relay K1, transformer line voltage winding 100. When the diode bridge is effectively shorted, resistors R102 and R103 are both at ground potential allowing transistor Q1 to be biased off. When transistor Q1 is off, its collector voltage is pulled high by resistor R104 which also allows resistor R105 to pull the base of transistor Q2 high, turning transistor Q2 on. When transistor Q2 is on, it initiates the oscillator circuit board 47 as will be discussed below.

When the inverter is operable, rectifier means formed by silicon controlled rectifiers SCR1 and SCR4 are fired alternately with silicon controlled rectifiers SCR2 and SCR3. When rectifier SCR1 fires, a primary path is established from the positive side of the DC storage means 30 through circuit breaker CB1 to the center tap 3 of low voltage winding 110 of the transformer T1, the top half of winding 110, the ten turn winding on the inductor L1 (left side, FIG. 5), the rectifier means SCR1, and back to the common bus. Alternately then, rectifier SCR2 fires connecting a path from the center tap of winding 110 through the bottom half of the same winding, the ten-turn bottom winding 5 on inductor L1 (left side, FIG. 5), the rectifier SCR2 to the common bus 101. The alternating current on winding 110 produced by the firing of rectifiers SCR1 and SCR2 induces a magnetic field in the core of transformer T1 which induces current in line voltage winding 100 at a higher voltage. Line voltage winding 100 supplies power through diode bridge CR1, the relay K1, and the weatherproof duplex 102 to the load in a fashion compatible with powering the load. The magnetic field also induces a field in the upper and low portions of a high voltage winding 112 of the transformer T1 which is rectified by the dual redundant high voltage diodes CR2-CR5. The rectified output from these diodes charges capacitors C1-C4 each half cycle. The charge on these capacitors is coupled through a fifteen-turn winding inductor 9 on L1 (right side, FIG. 5) into rectifiers SCR3 and SCR4. The charge stored in the capacitors C1-C4 is discharged through rectifiers SCR3 and SCR4 to ground and a large counter electromotive force is generated in inductor L1 in such a way as to more than cancel the primary current flowing through the ten-turn winding 5 of inductor L1. This allows rectifiers SCR1, SCR2 to see reverse current for a short period at the end of each half cycle. These rectifiers can then off and revert to a high resistance state.

When the load at the duplex outlet 102 is removed, the top end of diode bridge rectifier CR1 goes to 1.4 volts with respect to the common bus. Resistor R102 positively biases the emitter-base junction on transistor Q1 turning it to the on condition. When transistor Q1 turns on, resistor R104 is pulled to ground and capacitor C101 discharges. When capacitor C21 discharges, the bias of transistor Q3 drops to zero allowing resistor R109 to energize transistor Q4. Transistor Q4 signals the oscillator board through pin H to stop so that inverter operation is ceased.

The oscillator circuit 47 controls the inverter of the present invention. With reference to FIG. 6, when transistor Q2 is biased to the on condition, an opto-coupler U201 is energized through pins I, J allowing transistor Q5 to be biased on, thereby supplying a reference voltage to regulator U2. When this occurs, resistor R201 charges capacitor C201 over a period of approximately thirty-three milli-seconds. This voltage is applied through two inverting Schmitt triggers U202 to a binary counter U204. A crystal oscillator XC1 is thereby powered and oscillates at 3.932160 MHZ. This frequency is dividied by two dual flip-flops U205 and a divider U205A to a value of 240 Hertz. The 240 Hertz signal is used as the clock input of binary counter U204. This counter is operable to count from zero to fifteen. The count is decoded by decorder U206 having a count range from 0 to 9 and a single associated output pin 0–9 for each of these values. When the count of counter U204 reaches eight, pin No. 10 of U206 goes low, which activates load pin L of U204 causing the binary counter 204 is reset to five so that U4 repetitively counts from five to eight. When counter U204 reaches a count of five or six, transistor Q6 is activated and when the counter reaches a count of seven or eight transistors, Q7 and Q8 are activated. Transistor Q6 controls SCR1 and SCR4; Q7 controls SCR3; and transistor Q8 controls SCR2.

When transistor Q4 is biased on, a portion of U203 becomes inoperable. This condition activates Schmitt trigger U202 which prevents a load signal from reaching load pin L of U204. When this occurs, binary counter U204 continues counting beyond eight rather than resetting back to five. When the counter reaches a count of nine, transistor Q6 is activated for the last time and when the counter reaches a count of eleven, transistor Q8 is activated for the last time operating SCR3. This insures that rectifiers SCR1 and SCR2 are both turned to a high impedance state, such that the inverter operation can cease with no current flowing through the primary path. After counter U204 counts to fifteen, it returns to a count of zero which allows transistor U201 to turn off, in turn deactivating transistor Q5. The oscillator board is thereafter shut off and the inverter operation is discontinued.

CHARGER CIRCUIT

With reference to FIG. 5, utility power comes in on the battery charging plug P1. The voltage from the hot side of plug P1 goes through safety switch SW2, through connector CNR2-CNR1 to pin 6 of relay K1 and on to the anode of diode CR6, causing capacitor C5 to rapidly charge to approximately one hundred sixty volts. This voltage is applied through resistors R17 and R18 to the base of transistor Q1, so that current form capacitor C5 through resistors R17 and R18 causes transistor Q1 to turn on. This overrides the load demand circuit board and insures that the inverter is not operable during the charge operation. The utility voltage from plug 1 is also applied to small diode CR7 which rectifies the utility power and charges capacitor C6 through resistor R10. When capacitor C6 charges to approximately twenty volts, relay K1 is energized. The delay provided by resistor R10 and capacitor C6 insures that the load response has time to stop the oscillator circuit board before relay K1 is energized. When relay K1 is energized utility power is routed through a ten amp breaker CB2 and pins 4 and 7 of relay K1 to pin 11 of and relay K2. When relay K2 is deenergized relay K2 carries this current through resistors R1, R2, R3, R4, R5 and R6 to the eighty-five turn tap on line voltage winding 100 of transformer. The resulting voltage induced in low voltage winding 110 is applied to the positive side of the DC storage means 30 through the center tap of winding 110, the parallel ten-turn windings of L1, through diodes CR8 and CR9 to the common bus 101. Diodes CR8 and CR9 rectify the output from winding 110 and route the rectified output to the DC storage means 30.

Another pole (pins 6 and 105) on relay K1 switches the duplex receptacle's source of power from the inverter circuit to utility power. A third set of contacts (2, 8) on relay K1 deenergizes the load demand circuit board and oscillator circuit board and connects the DC storage means to the charger switching board assembly 50. The charger switching board assembly 50 takes a portion of the DC power from the battery and converts it to a regulated voltage by regulator U301. A portion of this regulated output is taken at the wiper arm of resistor R301 and compared to a portion of the battery voltage sensed through a voltage divider consisting of resistors R21 and R308. These two voltages are compared by a comparator U302 and when the DC storage means exceeds approximately 31.5 volts, diode CR301 is reverse biased allowing capacitor C24 to slowly charge through resistor R33. After approximately 38 seconds the voltage at the point connecting capacitor C24 and resistor R33 falls below the voltage provided to U302 causing the collector of transistor Q301 to be pulled low, thereby forward biasing the emitter-base junction of transistor Q302. When the emitter-base junction of transistor Q302 is forward biased, the collector of transistor Q302 is pulled up to twenty four volts. This twenty four volts is reduced to twelve volts through parallel, 200 ohm, 5 watt resistors R23, and activates relay K2. Relay K2 bypasses the path from utility power to the parallel combination of resistors R1–R6 through R7. This causes the current through winding 100 to be greatly reduced until the output from winding 110 is just enough to trickle charge the DC storage means 30 through circuit breaker CB1. The output of U301 also causes a change in the reference voltage to U301 through resistor R307. This provides approximately one volt differential on the charger circuit ensuring a rapid charge of the DC storage means until the storage means voltage reaches 31.5 volts and remains there for approximately 38 seconds. At the end of 38 seconds, the current into the storage means is reduced to a trickle. If at that time the voltage on the storage means falls below 29.5 volts, the charger circuit deenergizes relay K2 and waits another 38 seconds during which time the storage means is charged at the rapid rate. Eventually the storage means becomes charged sufficiently such that a trickle charge will maintain 29.5 volts on the storage means. At this time the trickle charge becomes continuous and the storage means are maintained in a ready condition without overcharging or boiling.

Whenever circuit breaker CB1 is in the ON position, charge meter M1 indicates voltage at the storage means on a scale marked, "low", "normal" and "charge". This provides the user with feedback on remaining capacity in the storage means when the present invention is either in a dormant condition or is being used as a power source, and replenished capacity during the charge cycle. If the cover means is opened during charging, a two-pole cover safety switch SW2 disconnects utility power and protects the user from hazardous voltages in the chassis.

TABLE 1

| Reference Designation | Description |
| --- | --- |
| CB2 | 10 amp |
| C20 | 0, 22, μf, 200 VDC |
| CR7 | 1N4005 |
| R10 | 1000 ohm, 11W |
| C6 | 470, μf, 50V |
| CR6 | 1N4005 |
| C5 | 10 μf, 250 VDC |
| R17 | 43K, 1W |
| R18 | 43K, 1W |
| K1 | relay, 120 VAC |
| K2 | relay, 12 VDC |
| R7 | 25 ohm, 50W |
| CR1 | KMPC 2504 |
| R1–R6 | 3 ohm, 25W |
| R101 | 2.2K. ¼W |
| R102 | 1K |
| R103 | 82K |
| R104 | 2.2K, ¼W |
| R105 | 4.7K |
| R106 | 82K |
| R107 | 2.2K |
| R108 | 82K |
| R109 | 1.2K |
| Q1 | 2N3704 |
| Q2 | 2N3704 |
| Q3 | 2N3704 |
| Q4 | 2N3704 |
| CNR9 | 5 pin Molex female |
| CNR10 | 5 pin Molex male |
| CR11 | 1N4742A |
| C22 | 100 μf, 25V |
| R20 | 390 ohm, 3 watt |
| U301 | LM 78L08A |
| R34 | 1K |
| R301 | 1K |
| R35 | 1.5K |
| R21 | 24K |
| U302 | LM 324 |
| C23 | 10 μf, 25V |
| CR301 | 1N4005 |
| R307 | 82K |
| R33 | 2.2Meg |
| R32 | 18K |
| CR302 | 1N4005 |
| Q301 | 2N3704 |
| Q302 | 2N3704 |
| R23 | dual 200 ohm, 5W |
| CR12 | 1N4005 |
| CNR7 | 4 pin Molex, female |
| CNR8 | 4 pin Molex, male |
| CNR1 | 6 pin Molex, female |
| CNR2 | 6 pin Molex, male |
| CNR3 | single pin Molex |
| CNR4 | single pin Molex |
| CNR5 | single pin Molex |
| CNR6 | single pin Molex |
| SCR3 | D1351 |
| SCR4 | D1351 |
| R24 | 100 ohm. ¼W |
| R25 | 100 ohm, ¼W |
| CR2 | S6A8 |
| CR3 | S6A8 |
| CR4 | S6A8 |
| CR5 | S6A8 |
| CR8 | 1N1186 |
| CR9 | 1N1186 |
| C1 | 10 μf, 370 VAC |
| C2 | 10 μf, 370 VAC |
| C3, 4 | 20 μf, 370 VAC |
| R30 | 220K, 1W |
| R31 | 220K. 1W |
| SCR1 | C154B |
| SCR2 | C154B |
| R26 | 100 ohm, ¼W |

TABLE 1-continued

| Reference Designation | Description |
| --- | --- |
| R27 | 4.7 ohm, 1W |
| R28 | 4.7 ohm, 1W |
| C25 | 1 μf, 200V |
| C26 | 1 μf, 200V |
| R29 | 100 ohm, ¼W |
| R36 | 470 ohm |
| R37 | 40 ohm, 10W |
| CR13 | 1N4751A |
| U210 | LM 723 |
| C27 | 0.001 μf, 25V |
| R38 | 1.5K |
| R39 | 2.2K |
| Q9 | TIP 3055 |
| CR14 | 1N4005 |
| C28 | 470 μf 25V |
| CR15 | 1N4005 |
| R40 | 51 ohm |
| C29 | 100 μf, 25V |
| R41 | 51K |
| Q5 | 2N4356 |
| R42 | 5.1K |
| R43 | 560 ohm |
| R44 | 43K |
| R45 | 1M |
| U201 | NCT 200 |
| C30 | 0.1 μf |
| C31 | 0.33 μf |
| U2 | LM 78L08-ACZ |
| C32 | 0.1 μf |
| C33 | 0.1 μf |
| R50 | 1K |
| R51 | 1K |
| Q6 | 2N4356 |
| U203 | LM 3145AN |
| R52 | 56, ohm 3V |
| R53 | 100 ohm, 1W |
| R46 | 5.1K |
| R47 | 5.1K |
| CR16 | 1N4005 |
| R48 | 33K |
| C34 | 0.1 μf |
| U202 | 74C14 |
| U207 | 74C00 |
| U208 | 74C02 |
| U204 | 74C02 |
| U206 | 74C42 |
| CR17 | 1N4005 |
| CR18 | 1N4005 |
| CR19 | 1N4005 |
| CR20 | 1N4005 |
| R55 | 100K |
| R56 | 100K |
| R51 | 1Meg |
| XC1 | Crystal 3.92 Mhz |
| C35 | 33 pf |
| C36 | 33 pf |
| U205 | 74C107 |
| U209 | 74C10 |
| R58 | 1K |
| R59 | 1K |
| R62 | 56 ohm, 3W |
| R63 | 1K |
| R64 | 1K |
| R67 | 100 ohm, 1W |
| Q8 | 2N4356 |
| R65 | 2.2K |
| R66 | 2.2K |
| Q7 | 2N4356 |
| U205A | 5640 or MC14040B |

We claim:
1. An apparatus providing a source of alternating current power for power devices comprising:
 (a) a frame member;
 (b) a plurality of ground engaging wheels for transporting said frame member over the ground;

(c) DC storage means carried on said frame member, said DC storage means having positive and negative outputs;

(d) a transformer means having a low voltage center tapped winding, a line voltage winding, and a high voltage winding, wherein said low voltage center tapped winding is interconnected with the positive output of said DC storage means and wherein said line voltage winding is operable to produce an AC output voltage suitable for powering devices;

(e) first and second controllable rectifier means operably interconnected with both said high voltage winding and said low voltage center tapped winding;

(f) oscillatory circuit means for alternately activating said first and second rectifier means to provide first and second conduction paths for the power in said DC storage means through opposite halves of said transformer means low voltage center tapped winding; and (g) means for alternately terminating the operation of said first and second rectifier means by producing a reverse voltage in series with the first and second conduction paths extending between said DC storage means and the opposite halves of said transformer low voltage center tapped winding.

2. The apparatus of claim 1, further including means for charging said DC storage means from an AC power source, said charging means comprising:

(a) first switch means operable to allow said transformer line voltage winding to receive AC power;

(b) an inductor having a plurality of multi-turn windings with one multi-turn winding being interconnected with one end of said transformer low voltage center tapped winding and another of said multi-turn windings being interconnected with the other end of said transformer low voltage center tapped winding; and (c) a plurality of rectifier means interconnected with said inductor; said rectifier means including a third rectifier means being disposed between one multi-turn winding and the negative output of said DC storage means and a fourth rectifier means being disposed between the other multi-turn winding and the negative output of said DC storage means, with said third and fourth rectifier means being operable to rectify said AC power and provide a DC power source at the center tap of said low voltage center tapped winding.

3. The apparatus of claim 2, further comprising means in communication with said first switch means for sensing the charge on said DC storage means, said means being operable to reduce the rate of charge supplied thereto when the charge reaches a predetermined valve.

4. The apparatus of claim 1, further comprising a cover hingedly secured to said frame member for providing a drip proof housing for said transformer means and said plurality of controllable rectifier means.

5. The apparatus of claim 4, wherein said cover:
extends over said plurality of DC storage means; and
has vent cap means above said plurality of DC storage means for venting the discharge of gas therefrom into the environment.

6. The apparatus of claim 1, wherein said DC storage means comprises a plurality of deep discharge batteries in series communication with each other.

7. The apparatus of claim 1, wherein said frame member further comprises:

(a) a ground engaging foot member disposed substantially forwardly under said frame member enabling said frame member to be maintained substantially parallel to the ground;

(b) a forward handle detachably secured to said foot member enabling said foot to be lifted from ground engagement and said frame member to be moved along the ground.

8. The apparatus of claim 1, wherein said DC storage means are carried on said frame member rearwardly of said ground engaging wheels enabling the center of gravity of said frame member to be substantially rearwardly of said ground engaging wheels.

9. The apparatus of claim 1, wherein said oscillatory circuit means produces activating signals to alternatively activate said first and second rectifier means.

10. The apparatus of claim 9, wherein said oscillatory circuit means comprising:

a signal generator;
binary counter means for counting the signals generated by said signal generator;
decoder means for transforming the value of the signals counted by said binary counter into activating signals corresponding to the signal value counted by said binary counter; and
means for automatically resetting said binary counter to a lower count level when a preselected upper count level is reached, thereby repeatedly generating the activating signals.

11. The apparatus according to claim 1 or 10:
further comprising first inductor means in series with the first and second conduction paths extending between said DC storage means and each half of said transformer low voltage center tapped winding; and
said terminating means including:
first and second charge storage means energized simultaneously with the activation of a corresponding first and second rectifier means;
a second inductor means operably associated with said first inductor means; and
means for discharging said first and second charge storage means to generate an electromotor force which acts counter to and which is larger than the electromotor force generated by said first inductor means.

12. The apparatus according to claim 11, wherein said discharge means is activated by said oscillatory circuit means.

13. The apparatus of claim 2, further comprising second switching means for automatically deactivating said oscillatory circuit means during the operation of said charging means.

14. The apparatus of claim 1, further comprising load demand circuit means for sensing the presence of the load on said line voltage winding of said transformer to initiate operation of said oscillatory circuit means during a presence of the load on said transformer line voltage winding.

15. An apparatus providing a source of alternating current power for power devices, said apparatus comprising:

(a) a plurality of DC storage means having positive and negative outputs thereon;

(b) inverter means operably interconnected to said DC storage means for transforming the DC power from said DC storage means into AC power, said inverter means including:

transformer means having a low voltage center tapped winding, a line voltage winding, and a high voltage winding, wherein said low voltage center tapped winding is interconnected with the positive output of said DC storage means, and wherein said line voltage winding is operable to produce an AC output voltage suitable for powering devices; and first and second controllable rectifier means operably interconnected with both said high voltage winding and said low voltage center tapped winding;

(c) oscillatory circuit means for alternately activating said first and second rectifier means to provide first and second conduction paths for the power in said DC storage means through opposite halves of said transformer means low voltage center tapped winding; and (d) means for alternately terminating the operation of said first and second rectifier means by producing a reverse voltage in series with the first and second conduction paths extending between said DC storage means and the opposite halves of said transformer low voltage center tapped winding.

16. The apparatus according to claim 15, wherein said oscillatory circuit means comprising:

a high frequency signal generator;

binary counter means for counting said signals produced by said signal generator; and decoder means for transforming the value of the signal counted by said binary counter into activating signals corresponding to the signal value counted by said binary counter for alternatively activating said first and second rectifier means.

17. The apparatus of claim 15 or 16, wherein:

said inverter means further comprising first inductor means in series with the first and second conduction paths extending between said DC storage means and each half of said transformer low voltage center tapped winding; and said terminating means including:

charge storage means operably associated with said first and second conduction paths and energized simultaneously with the activation of said first and second rectifier means;

second inductor means operably associated with said first inductor means; and means for discharging said charge storage means to produce an induced voltage acting in opposition to and at a level greater that the induced voltage produced by said first inductor means.

18. The apparatus according to claim 17, wherein said discharge means being activated by said oscillatory circuit means.

19. The apparatus according to 15, further comprising load demand circuit means for sensing the current demand on said transformer line voltage winding to initiate operation of said oscillating circuit means during the presence of a load on said transformer line voltage winding.

20. The apparatus of claim 15, further comprising means for charging said DC storage means from an AC power source, said charging means comprising:

first switch means operable to interconnect said transformer line voltage winding with said AC power source;

an inductor having a plurality of multi-turn windings, with one of said multi-turn windings being interconnected with one end of said transformer low voltage center tapped winding and another of said multi-turn windings being interconnected with the other end of said transformer low voltage center tapped winding;

third rectifier means being disposed between one of said multi-turn windings and the negative output of said DC storage means;

a fourth rectifier means being disposed between the other of said multi-turn windings and the negative output of said DC storage means; and wherein said third and fourth rectifier means being operable to rectify said AC power and provide a DC power source at the center tap of said transformer low voltage center tapped winding.

21. The apparatus of claim 20, further comprising means in communication with said first switch means for sensing the charge on said DC storage means, said sensing means being operable to reduce the rate of charge supplied to said DC storage means when the charge on said DC storage means reaches a predetermined level.

22. The apparatus according to claim 20, further comprising second switching means for automatically deactivating said oscillatory circuit means during the operation of said charging means.

* * * * *

UNITED STATES PATENT AND TRADEMARK OFFICE
CERTIFICATE OF CORRECTION

PATENT NO. : 4,376,250
DATED : March 8, 1983
INVENTOR(S) : James W. Baker, Jr. et al.

It is certified that error appears in the above—identified patent and that said Letters Patent is hereby corrected as shown below:

Column 3, line 62, insert --in-- after "means"
Column 5, line 50, insert --a line voltage-- before "winding"
line 50, delete "a line voltage" after "100"
Column 6, line 60, insert --turn-- before "off"
Column 8, line 3, delete "and" after "of"
line 6, insert --T1-- after "transformer"

Signed and Sealed this

Fifth Day of July 1983

[SEAL]

Attest:

*Attesting Officer*

GERALD J. MOSSINGHOFF

*Commissioner of Patents and Trademarks*